United States Patent

[11] 3,561,622

| [72] | Inventors | John Dioguardi<br>Port Washington;<br>Laszlo Nemessanyi, Westbury, N.Y. |
|---|---|---|
| [21] | Appl. No. | 824,133 |
| [22] | Filed | May 13, 1969 |
| [45] | Patented | Feb. 9, 1971 |
| [73] | Assignee | Tridair Industries<br>Redondo Beach, Calif.<br>a corporation of California by mesne assignments to |

[54] CARGO TRAILER WITH CONVEYOR ROLLERS
6 Claims, 13 Drawing Figs.
[52] U.S. Cl. .................................................... 214/38,
198/92; 280/491, 280/515
[51] Int. Cl. ....................................................B65g 67/02,
B60p 1/00
[50] Field of Search .......................................... 214/38, 84;
198/92

[56] References Cited
UNITED STATES PATENTS
| 2,346,659 | 4/1944 | Bruce ........................... | (214/38)UX |
| 3,306,477 | 2/1967 | Wriedt ......................... | 214/38 |

*Primary Examiner*—Robert G. Sheridan
*Attorneys*—Arthur W. Fuzak and Donald J. Ellingsberg ABSTRACT: A self-tracking trailer including a chassis with a running gear, identical coupling means at each end, conveyor rollers with interconnected driving means journaled transversely on the chassis so that torque applied to one roller will produce conjoint rotation to all rollers, means for transferring power from the drive vehicle to the rollers in the trailer and including a rotatable drive sleeve with a noncircular through bore at each end of the trailer and a flexible shaft extending in driving relation between the sleeves, a pair of stub shafts with friction wheels fast thereon, a gear on each stub shaft, a drive gear fast on the flexible shaft engaging said gears to drive the friction wheel in opposite directions.

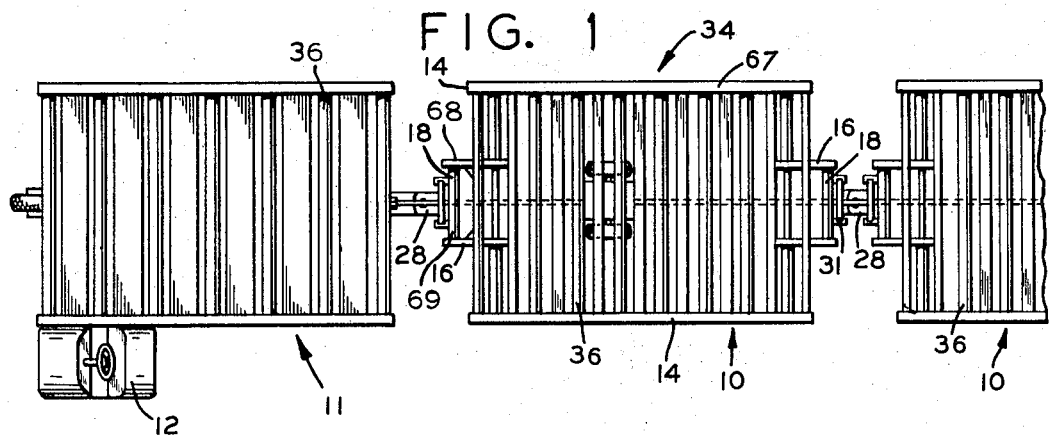
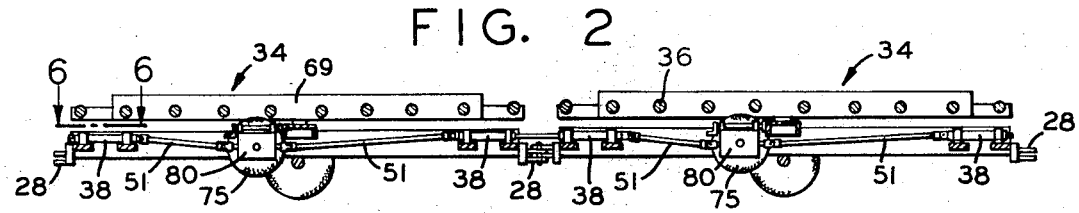
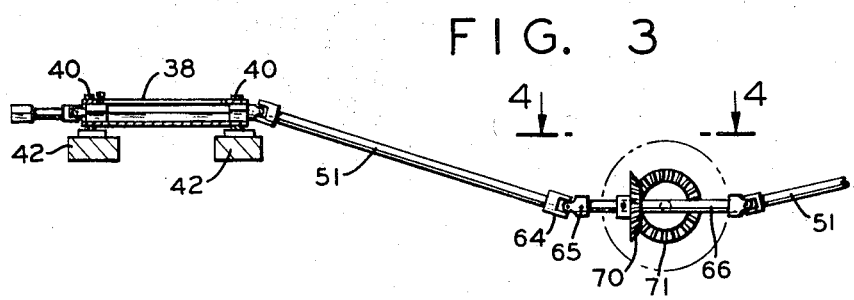
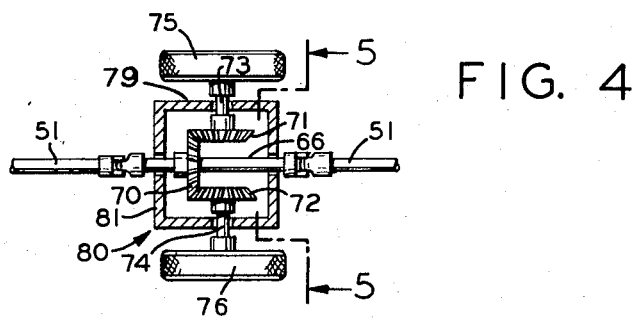
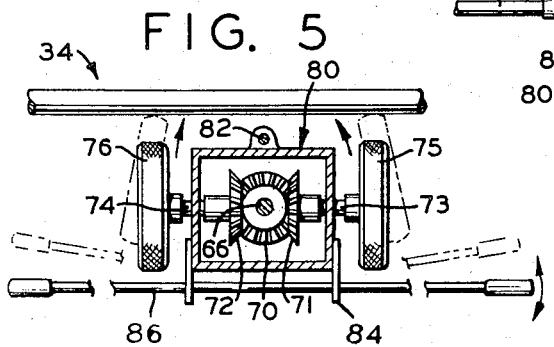
INVENTORS.
JOHN DIOGUARDI
LASZLO NEMESSANYI
BY
JOHN P. CHANDLER
THEIR ATTORNEY.

INVENTORS.
JOHN DIOGUARDI
LASZLO NEMESSANYI
BY
JOHN P. CHANDLER
THEIR ATTORNEY.

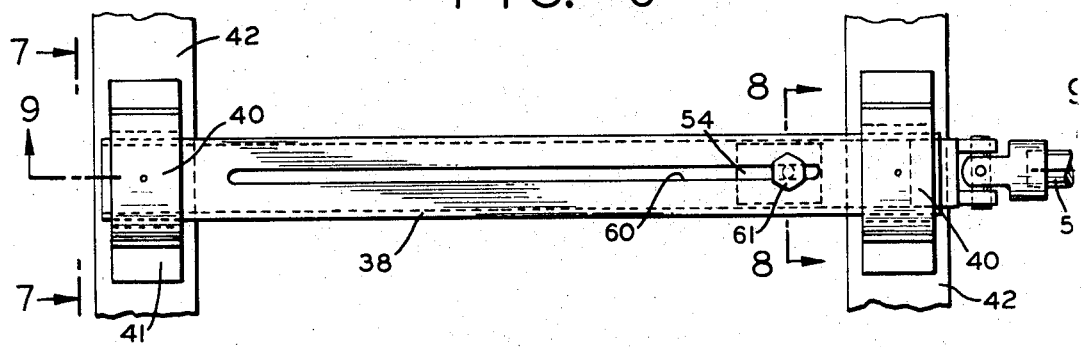
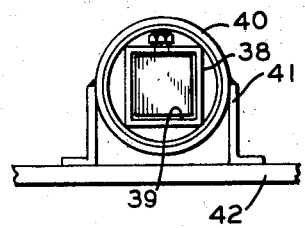
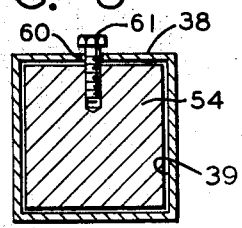
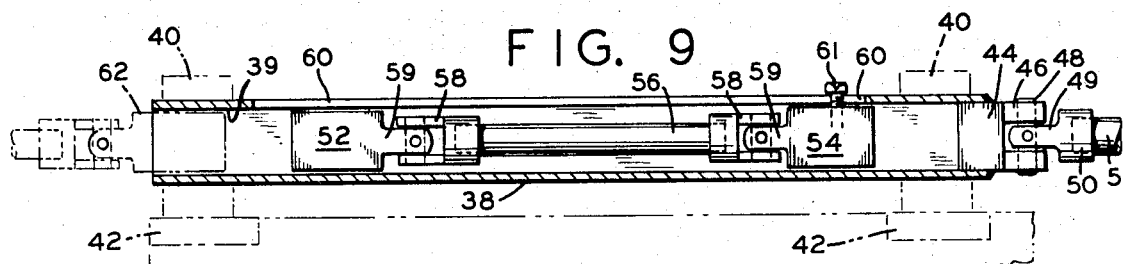
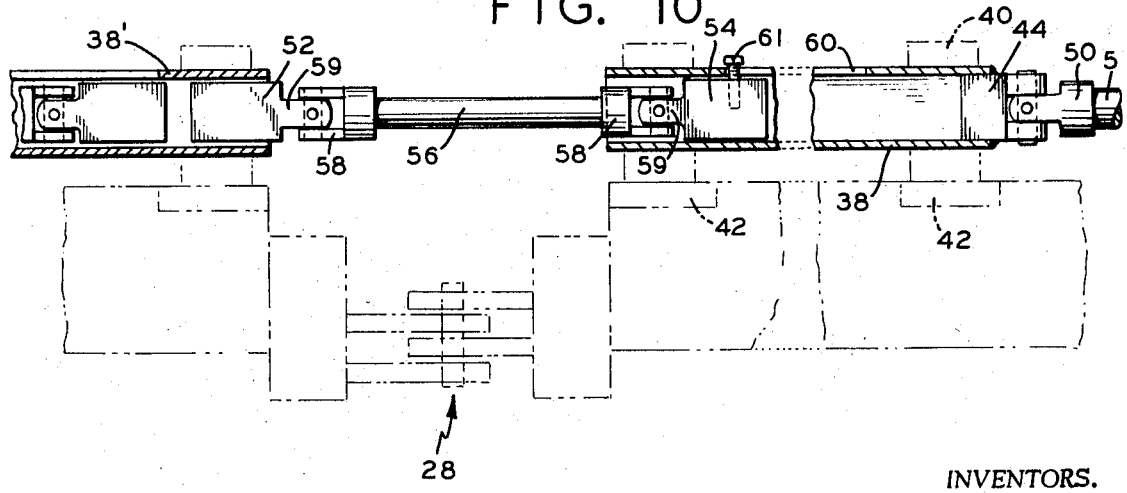
INVENTORS.
JOHN DIOGUARDI
LASZLO NEMESSANYI
BY
JOHN P. CHANDLER
THEIR ATTORNEY.

CARGO TRAILER WITH CONVEYOR ROLLERS

This invention relates to cargo trailers with a novel running gear and which when coupled in train will track the movements of the preceding trailer and which have identical coupling means at each end so that trailer hookup can be effected in any sequence without regard to end orientation.

An important object of the invention is to provide improved coupling means for trailers having such a running gear that one trailer moves almost precisely in the track of the preceding one and wherein the end couplings, each comprising a pair of vertically spaced draw bars, are captive horizontally but are free to move vertically within tracks which are secured to the chassis. This permits easy coupling by means of a simple coupling pin and avoids the possibility of excessive loads being imposed on the running gear and couplings when the train is towed over irregular terrain.

Another object of the invention is to provide a novel mechanical power transfer system for the trailer coupled in train with a single source of power in the lead vehicle which is transmitted to the trailers to be utilized for any useful purpose such as a rotating plurality of conveyor rollers on each trailer. A drive shaft composed of shaft sections joined by universal joints extends through each trailer and the improved arrangement is such that forward or reverse rotation is imparted to the rollers without reversing the direction of rotation of the flexible shaft carried in each trailer and running from end-to-end.

Yet a further object of the invention is to provide a power transfer system extending through several trailers connected in train to a drive vehicle wherein the flexible shaft in each trailer can be quickly and easily joined at either end to either end of the shaft in the next trailer.

In the drawings:

FIG. 1 is a plan view of a trailer train and drive vehicle embodying the present invention;

FIG. 2 is a side elevation of the trailers;

FIG. 3 is a broken side elevation of the power transmission system;

FIG. 4 is a broken section taken on line 4–4 of FIG. 3;

FIG. 5 is a broken section taken on line 5–5 of FIG. 4;

FIG. 6 is a broken section taken on line 6–6 of FIG. 2;

FIG. 7 is a section taken on line 7–7 of FIG. 6;

FIG. 8 is a section taken on line 8–8 of FIG. 6;

FIG. 9 is a section taken on line 9–9 of FIG. 6;

FIG. 10 is similar to FIG. 9 which shows an alternate coupling arrangement;

Figure 11:
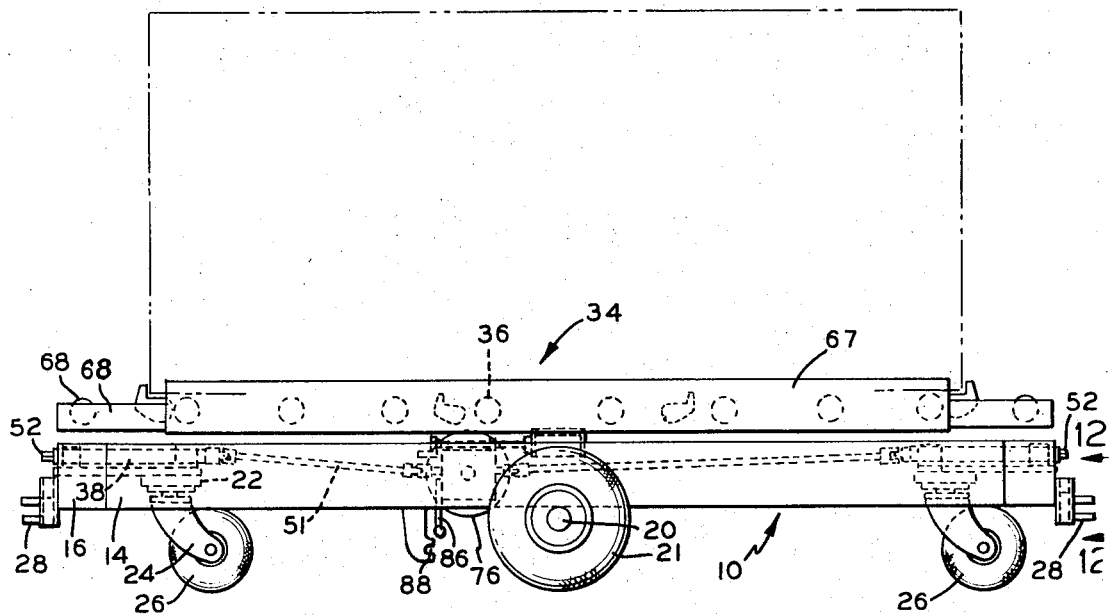
FIG. 11 is a side elevation of an individual trailer.
Figure 12:
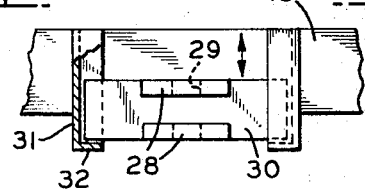
FIG. 12 is a section taken on line 12–12 of FIG. 11.
Figure 13:
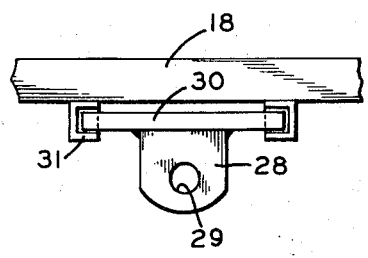
FIG. 13 is a section taken on line 13–13 of FIG. 12.

There is shown in FIG. 1 two trailers 10 of the present invention drawn by a powered drive vehicle 11 having a cab 12 for the driver. Each trailer has a frame structure with four longitudinal beams including outer beams 14 and intermediate beams 16 extending beyond the ends of beams 14 and which are joined by a transverse end structure 18 forming supports for the couplings for the trailers and for the flexible shafts forming parts of the mechanical power transfer system. The longitudinal beams are joined by transverse beams.

The self-tracking running gear includes a central axle 20 supported on a fixed axis on the frame and having wheels with tires 21 at its ends which support the major portion of the load. At each end the trailer is supported by a caster with a fixed upper section 22 attached to the frame and carrying a pivoted U-shaped frame 24 of arcuate contour when viewed from the side and supporting a wheel 26. The frames swivel to a trailing position when the trailer is moved in either direction.

Identical coupling means at each end of the trailer includes a pair of vertically spaced draw bars 28 having aligned holes 29 for a coupling pin (not shown). The draw bars are secured to a plate 30 mounted for vertical sliding movement in a pair of inwardly facing channeled tracks 31 secured to transverse support 18. Downward movement of the plate and draw bars is limited by inturned stops 32 at the lower ends of the tracks. When coupling one trailer to another, one draw bar of the latter passes between the two draw bars of the first. A pivoted frame or platform 34 is supported by the chassis and forms a turntable fitted with driven conveyor rollers 36. The specific structure of the turntable forms the subject matter of a copending application Ser. No. 824,144, filed May 13, 1969 which also includes means for rotating the conveyor rollers.

A single power source on the drive vehicle 11 is transmitted to the several trailers by means including a power drive shaft extending the full length of the trailer now to be described.

It was earlier pointed out that the identical coupling means at each end of the vehicle permit the trailers to be joined without regard to front-to-back couplers. The same is true of the coupling means for the power shaft which is essentially a shaft formed in a plurality of sections joined by universal couplings so that it can follow the contour of the trailer undercarriage. This shaft structure includes a coupling sleeve 38 which is a drive-power transmitting coupling. The sleeve has a noncircular through bore 39 shown as being square. It is journaled for rotation in bearing sleeves 40 supported by fixed brackets 41 at each end of the trailer. These brackets are welded to transverse frame members 42. The inner end of the coupling sleeve supports one part of a two part universal joint. The first part includes a short shaft section 44 which is welded therein and has spaced ears 46 at its opposite end. A pin 48 passes through these ears and through the second part 49 of the flexible coupling having a socket 50 which receives one end of a drive shaft 51 leading downwardly to the central section of the trailer.

Coupling sleeve 38 carries an extensible male coupling member forming in effect a spline and having square terminal blocks 52 and 54. A short drive shaft 56 is pivotally connected at each end with said blocks by means of two-part flexible couplings 58 and 59. The sleeve has a long slot 60 and a threaded pin 61 passes through said slot and into block 54, limiting outward travel of the extensible male coupling member. There is shown in broken lines at 62 in FIG. 9 another extensible coupling member positioned in the outer or left hand end of tube 38 in which instance the extensible coupling members 56—59 first described is not used. In FIG. 10, this coupling member has been extended out of tube 38 so that its outer block 52 has entered the next sleeve 38' to the left. It will be seen from the foregoing that each sleeve 38 has its own extensible coupling member 56—59, either one of which may be used when coupling two adjoining sleeves together.

A driving assembly similar to that just described extends inwardly from the opposite end of the trailer and both drive shafts 51, which are slightly downwardly inclined, are connected, by means of two part universal joints 64 and 65 to a central power takeoff shaft 66. The power is used for driving conveyor rollers 36 whereby cargo can be moved from end to end of the trailer or for the full length of the train if desired. The conveyor structure and the alternate drive from the flexible shafts just described form the subject matter of said copending application.

The conveyor rollers 36 can be mounted on the chassis itself, as is the case with the drive vehicle 11, or on a separate platform which is mounted on a vertical axis for rotation on the chassis by means of a king pin and form a turntable to enable cargo to be removed or added at any point in the train. The turntable conveyor on the trailer forms the subject matter of a copending application Ser. No. 824,144. If the trailer has the turntable, the rollers are journaled between structural beams 67 forming part of the frame for the turntable platform and means are provided by sprockets carried on the conveyor rollers and chains connecting the sprockets so that torque applied to any roller will impart conjoint rotation to all rollers. Spaced frame members 68 extend beyond the ends of beam 67 and support rollers 69 for rotation which connects for conjoint rotation with rollers 36.

The drive assembly includes a beveled gear 70 fast on shaft 66 engaging beveled gears 71 and 72 on stub shafts 73 and 74 carrying friction wheels 75 and 76. The shafts are journaled for rotation in sidewalls 79 of a gear box 80 having end walls 81 in which drive shaft 66 is journaled. With this arrangement, wheels 75 and 76 rotate in opposite directions. The gear box is mounted for side-to-side swinging movement on a shaft 82 mounted in the chassis frame.

Brackets 84 extend downwardly from each side of the gear box of the friction wheel assembly and which support a rod 86 extending to both sides of the trailer. Thus, when the rod on the left side of FIG. 5 is raised the friction wheel 76 contacts the conveyor roller and a bracket on that side with a notch 88 holds the rod and the wheel 76 in contact with the conveyor roller 36. When this end of the rod is released from the notch and the other end raised and inserted in its notch, wheel 75 engages the roller and the conveyor moves in the opposite direction.

We claim:

1. A self-tracking trailer to be coupled in train to others and drawn by a drive vehicle provided with a single power source for the trailers, said trailer including a chassis and a running gear therefor, including a central axle with wheels, and a caster pivoted at each end of the chassis, identical coupling means at each end to permit either end of one trailer to be joined to either end of another, conveyor rollers with interconnected driving means journaled transversely on the chassis so that torque applied to one roller will produce conjoint rotation to all rollers, means comprising a drive shaft structure in each trailer for transferring power from the drive vehicle to the rollers in the trailer and including a rotatable drive sleeve with a noncircular through bore at each end of the trailer and a flexible shaft extending in driving relation between the sleeves, a pair of stub shafts with friction wheels fast thereon, a gear on each stub shaft, a drive gear fast on the flexible shaft engaging said gears to drive the friction wheel in opposite directions, a power transmission frame forming a gear box, and bearings on said frame supporting the stub shafts for rotation, said frame being pivoted longitudinally of the chassis to permit either friction wheel to be raised into driving relation to a roller, and an extensible noncircular male coupling member carried in each sleeve and movable into a sleeve on an adjoining trailer in driving relation.

2. The trailer defined in claim 1 wherein the drive shaft structure has a central section on which said drive gear is mounted.

3. The trailer defined in claim 1 wherein the coupling means is a draw bar carried at its inner end on the chassis and having a coupling pin-receiving hole at the other end, said bar being captive horizontally and free to move vertically within a track secured to the chassis to avoid strain on the wheels when a train is towed over irregular terrain.

4. The trailer defined in claim 1 wherein said coupling means at each end of the trailer includes superimposed draw bars with aligned apertures, a block supporting the draw bars, and inwardly facing tracks on the chassis supporting the block for vertical sliding movement so that the meeting couplings on adjoining trailers are captive horizontally but free to move vertically to permit free movement of the coupled trailers when moving over rough terrain.

5. The trailer defined in claim 1 wherein each drive sleeve has a noncircular bore, and the extensible male coupling member has two blocks of similar contour slidable within the bore from a retracted to an extended position, and a flexible shaft connects the two blocks.

6. The trailer defined in claim 1 wherein each caster includes a wheel and a curved arcuate frame supporting the wheel so as to trail behind the pivot during movement of the trailer in either direction.